United States Patent
Wang et al.

(10) Patent No.: US 10,502,456 B2
(45) Date of Patent: Dec. 10, 2019

(54) EFFICIENT SOLAR FLAT PLATE HEAT ABSORPTION SYSTEM AND OPERATION METHOD THEREOF

(71) Applicant: HENAN SHUIMU ENVIRONMENTAL TECHNOLOGY CO., LTD., Zhengzhou, Henan (CN)

(72) Inventors: Bo Wang, Henan (CN); Wanpin Tian, Henan (CN); Zhenyu Luo, Henan (CN); Shuhong Song, Henan (CN); Shixi Wang, Henan (CN); Yulong Chen, Henan (CN); Yuanhui Guo, Henan (CN); Haoran Zhang, Henan (CN)

(73) Assignee: HENAN SHUIMU ENVIRONMENTAL TECHNOLOGY CO., LTD., Zhengzhou, Henan (CN)

( * ) Notice: Subject to any disclaimer, the term of this patent is extended or adjusted under 35 U.S.C. 154(b) by 131 days.

(21) Appl. No.: 15/749,080

(22) PCT Filed: Oct. 24, 2016

(86) PCT No.: PCT/CN2016/103111
§ 371 (c)(1),
(2) Date: Jan. 30, 2018

(87) PCT Pub. No.: WO2017/140117
PCT Pub. Date: Aug. 24, 2017

(65) Prior Publication Data
US 2018/0224162 A1    Aug. 9, 2018

(30) Foreign Application Priority Data
Feb. 15, 2016 (CN) .......................... 2016 1 0085024

(51) Int. Cl.
*F24S 20/00* (2018.01)
*E04H 4/12* (2006.01)
(Continued)

(52) U.S. Cl.
CPC .............. *F24S 20/02* (2018.05); *E04H 4/129* (2013.01); *F24S 10/50* (2018.05); *F24S 10/755* (2018.05);
(Continued)

(58) Field of Classification Search
CPC .......... F24S 20/02; F24S 50/40; F24S 10/755; F24S 80/30; F24S 10/50; E04H 4/129
See application file for complete search history.

(56) References Cited

U.S. PATENT DOCUMENTS

| 3,599,626 A | * | 8/1971 | Bouse | .................... F24S 10/755 126/643 |
| 4,213,563 A | * | 7/1980 | van Kuijk | ........... F28D 20/0039 237/2 B |

(Continued)

FOREIGN PATENT DOCUMENTS

| CN | 2627421 Y | 7/2004 |
| CN | 2735242 Y | 10/2005 |

(Continued)

OTHER PUBLICATIONS

International Search Report (English and Chinese) and Written Opinion of PCT/CN2016/103111 dated Feb. 6, 2017, 12 pages.

*Primary Examiner* — David J Laux
(74) *Attorney, Agent, or Firm* — Hamre, Schumann, Mueller & Larson, P.C.

(57) ABSTRACT

The invention discloses an efficient solar flat plate heat absorption system, composed of a primary circulating pipe network, a secondary circulating pipe network and a control system, wherein the primary circulating pipe network is
(Continued)

formed by communicating a pipeline in a pressure bearing water tank with a heat exchange tube I in a flat plate heat collector group through a pipeline I and a pipeline III, the secondary circulating pipe network is formed by communicating a pipe network at the bottom of a swimming pool with a heat exchange tube II in the flat plate heat collector group through a pipeline II and a pipeline IV, wherein thermometers are arranged at a water outlet of the heat exchange tube I, at the water outlet of the heat exchange tube II, in the swimming pool and in the pressure bearing water tank, and circulating pumps are arranged on the pipeline I and the pipeline II. The invention makes full use of the heat energy by using the two circulating pipe networks formed by the parallel double heat exchange tubes in the flat plate heat collector group to realize the automatic and constant-temperature heating of the water in a swimming pool and avoid the water temperature in the swimming pool fluctuating suddenly, meanwhile the redundant heat can be recycled, thereby making full use of energy, saving resources and having obvious social and economic benefits.

6 Claims, 1 Drawing Sheet

(51) Int. Cl.
*F24S 50/40* (2018.01)
*F24S 10/50* (2018.01)
*F24S 80/30* (2018.01)
*F24S 10/75* (2018.01)
*F24S 90/00* (2018.01)

(52) U.S. Cl.
CPC ............... *F24S 50/40* (2018.05); *F24S 80/30* (2018.05); *F24S 90/00* (2018.05); *Y02E 10/44* (2013.01)

(56) References Cited

U.S. PATENT DOCUMENTS 4,335,706 A * 6/1982 Passarelli ............. F25B 29/003
126/645
2014/0290915 A1* 10/2014 Koppikar ................. F28F 3/12
165/104.31

FOREIGN PATENT DOCUMENTS

| CN | 202467256 U | 10/2012 |
| CN | 203083165 U | 7/2013 |
| CN | 105546842 A | 5/2016 |
| CN | 205448364 U | 8/2016 |
| JP | 358195743 A | 11/1983 |
| WO | 0104549 A1 | 1/2001 |

* cited by examiner

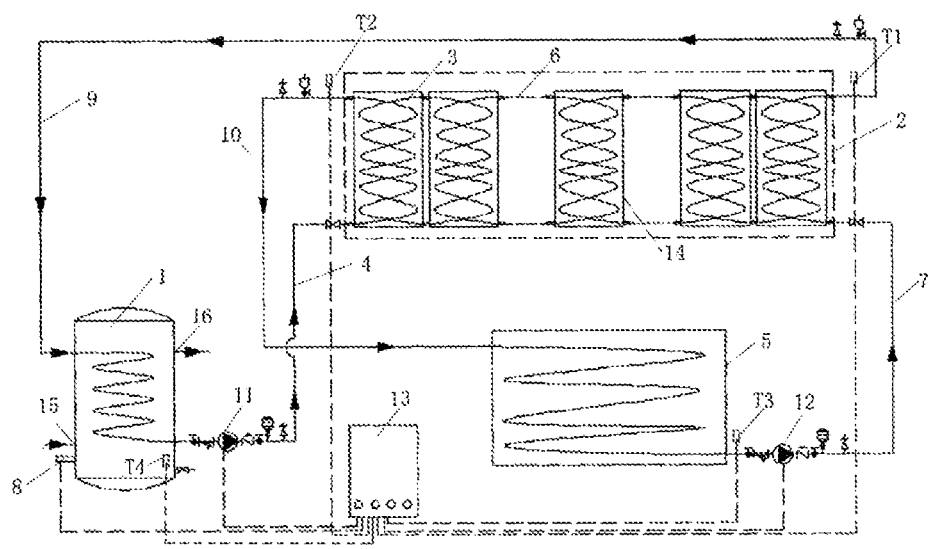

EFFICIENT SOLAR FLAT PLATE HEAT ABSORPTION SYSTEM AND OPERATION METHOD THEREOF

FIELD OF THE INVENTION

The present invention relates to the field of system energy heat supply, and in particular to an efficient solar flat plate heat absorption system and an operation method thereof.

BACKGROUND OF THE INVENTION

The traditional systems for supplying hot water to swimming pools include vacuum tube type solar hot water systems, flat plate type solar hot water systems (single pipes are arranged in flat plate heat collectors), hot water boiler systems (fuel gas, electricity, coal and the like) have the defects that they cannot heat the water in the swimming pools at constant temperatures, and other forms of heat supply can cause energy waste and environmental pollution.

SUMMARY OF THE INVENTION

Based on the above defects, the present invention provides an efficient solar flat plate heat absorption system and an operation method thereof. The heat efficiency of the system is improved by a method of realizing double-pipeline circulation in the solar flat plate heat absorption system, and the problem that water in the swimming pools cannot be heated at constant temperatures.

The present invention is realized as follows: an efficient solar flat plate heat absorption system is composed of a primary circulating pipe network, a secondary circulating pipe network and a control system, the primary circulating pipe network is formed by communicating a pipeline in a pressure bearing water tank with a heat exchange tube I in a flat plate heat collector group through a pipeline I and a pipeline III, the secondary circulating pipe network is formed by communicating a pipe network at the bottom of a swimming pool with a heat exchange tube II in the flat plate heat collector group through a pipeline II and a pipeline IV, wherein an electric heater is arranged in the pressure bearing water tank, a first thermometer is arranged at a water outlet of the heat exchange tube I, a second thermometer is arranged at the water outlet of the heat exchange tube II, a third thermometer is arranged in the swimming pool, a fourth thermometer is arranged in the pressure bearing water tank, a primary circulating pump is arranged on the pipeline I, a secondary circulating pump is arranged on the pipeline II, and the electric heater, the first thermometer, the second thermometer, the third thermometer, the fourth thermometer, the primary circulating pump and the secondary circulating pump are connected with the control system.

The flat plate heat collector group is composed of a plurality of flat plate heat collectors connected in series, and the heat exchange tube I and the heat exchange tube II are connected in parallel.

A water inlet and a water outlet are formed in the pressure bearing water tank, the water inlet is connected with a cold water pipeline, and the water outlet is connected with a hot water pipeline.

Automatic exhaust valves, pressure release valves, one-way valves, filters, brake valves and solenoid valves are additionally installed in the primary circulating pipe network and the secondary circulating pipe network.

The control system is a control cabinet.

The operation method of the efficient solar flat plate heat absorption system is as follows: when the sunlight is sufficient, for the primary circulating pipe network, if the temperature of the first thermometer reaches a set temperature, the control system starts the primary circulating pipe network by starting the primary circulating pump, if the temperature of the first thermometer is smaller than the set temperature, the control system stops the operation of the primary circulating pipe network, when the sunlight is not sufficient, for the primary circulating pipe network, the control system starts the electric heater in the pressure bearing water tank, and when the water in the pressure bearing water tank reaches the temperature of the fourth thermometer, the control system starts the primary circulating pipe network; and for the secondary circulating pipe network, if the temperature of the second thermometer reaches the set temperature, the control system starts the secondary circulating pipe network by starting the secondary circulating pump, if the temperature of the second thermometer is smaller than the set temperature, the control system stops the operation of the secondary circulating pipe network, so that the secondary circulating pipe network controls the circulation of the secondary circulation pipe intermittently according to the temperature of the second thermometer through the control system, so that the water temperature in the swimming pool is constant, that is, the third thermometer reaches the set value.

Compared with the prior art, the present invention has the following beneficial effects:

The present invention makes full use of the heat energy by using the two circulating pipe networks formed by the parallel double heat exchange tubes in the flat plate heat collector group to realize the automatic and constant-temperature heating of the water in the swimming pool and avoid the water temperature in the swimming pool fluctuating suddenly, meanwhile the redundant heat can be recycled, thereby making full use of energy, saving resources and having obvious social and economic benefits.

BRIEF DESCRIPTION OF THE DRAWINGS

FIG. 1 is a structural schematic diagram of an efficient solar flat plate heat absorption system of the present invention.

DETAILED DESCRIPTION OF THE EMBODIMENTS

An efficient solar flat plate heat absorption system is composed of a primary circulating pipe network, a secondary circulating pipe network and a control system, the primary circulating pipe network is formed by communicating a pipeline in a pressure bearing water tank 1 with a heat exchange tube I 3 in a flat plate heat collector group 2 through a pipeline I 4 and a pipeline III 9, the secondary circulating pipe network is formed by communicating a pipe network at the bottom of a swimming pool 5 with a heat exchange tube II 6 in the flat plate heat collector group 2 through a pipeline II 7 and a pipeline IV 10, wherein an electric heater 8 is arranged in the pressure bearing water tank 1, a first thermometer T1 is arranged at a water outlet of the heat exchange tube I 3, a second thermometer T2 is arranged at the water outlet of the heat exchange tube II 7, a third thermometer T3 is arranged in the swimming pool 5, a fourth thermometer T4 is arranged in the pressure bearing water tank 1, a primary circulating pump 11 is arranged on the pipeline I 4, a secondary circulating pump 12 is arranged on the pipeline II 7, and the electric heater 8, the first thermometer T1, the second thermometer T2, the third thermometer T3, the fourth thermometer T4, the primary circulating pump 11 and the secondary circulating pump 12 are connected with the control system 13. In a use process, in the primary circulating pipe network, the water flow flows from the pipeline of the pressure bearing water tank 1 into the heat exchange tube I 3 in the flat plate heat collector group 2 through the pipeline I 4 and then returns into the pipeline of the pressure bearing water tank 1 through the pipeline III 9 so as to form a circulation; and in the secondary circulating pipe network, the water flow flows from the pipe network at the bottom of the swimming pool 5 into the heat exchange tube II 6 in the flat plate heat collector group 2 through the pipeline II 7 and returns into the pipe network at the bottom of the swimming pool 5 through the pipeline IV 10 so as to form a circulation. The set temperatures of the second thermometer T2 and the third thermometer T3 are parameter values that are comprehensively set according to the actual water temperature in the swimming pool 5, the necessary temperature of the swimming pool 5 and the use time of the swimming pool 5, and the set temperature of the second thermometer T2 is greater than the set temperature of the third thermometer T3.

In order to realize heat exchange more sufficiently, the flat plate heat collector group 2 is composed of a plurality of flat plate heat collectors 14 connected in series, and the heat exchange tube I 3 and the heat exchange tube II 6 are connected in parallel.

In order to make full use of the heat energy and save resources, a water inlet 15 and a water outlet 16 are formed in the pressure bearing water tank, the water inlet 15 is connected with a cold water pipeline, and the water outlet 16 is connected with a hot water pipeline, so that hot water heated in the pressure bearing water tank 1 can be used in the hot water pipeline, but the hot water in the hot water pipeline is only used as domestic water.

Automatic exhaust valves, pressure release valves, one-way valves, filters, brake valves and solenoid valves are additionally installed in the primary circulating pipe network and the secondary circulating pipe network.

The control system 8 is a control cabinet. The control components are correspondingly connected to corresponding ports of the control cabinet via cables, and the water in the swimming pool 5 is heated to the necessary temperature at a constant temperature under the action of the control cabinet, and its temperature value can be autonomously set in the control cabinet.

The operation method of the efficient solar flat plate heat absorption system is as follows: when the sunlight is sufficient, for the primary circulating pipe network, circulating water is heated in the flat plate heat collector group 2, if the temperature of the first thermometer T1 reaches the set temperature, the control system 8 starts the primary circulating pipe network by starting the primary circulating pump 11, the water in the pressure bearing water tank 1 is heated, the hot water heated in the pressure bearing water tank 1 can be used in the hot water pipeline, and if the temperature of the first thermometer T1 is smaller than the set temperature, the control system 8 stops the operation of the primary circulating pipe network. When the sunlight is not sufficient, for the primary circulating pipe network, the control system 8 starts the electric heater 8 in the pressure bearing water tank, and when the water in the pressure bearing water tank reaches the temperature of the fourth thermometer T4, the control system starts the primary circulating pipe network, as the heat exchange tube I 3 and the heat exchange tube II 6 are connected in parallel, the hot water in the heat exchange tube I 3 can heat the circulating water in the heat exchange tube II 6, when the water in the heat exchange tube II 6 is heated to the set temperature of T2, the secondary circulating pipe network is started for heating the swimming pool, therefore it is guaranteed that even if the sunlight is insufficient, the water in the swimming pool 5 is at a constant temperature. For the secondary circulating pipe network, if the temperature of the second thermometer T2 reaches the set temperature, the control system 8 starts the secondary circulating pipe network by starting the secondary circulating pump 12 so as to heat the water in the swimming pool so as to guarantee the constant temperature of the water in the swimming pool; if the temperature of the second thermometer T2 is smaller than the set temperature, the control system 8 stops the operation of the secondary circulating pipe network to guarantee the temperature of the water in the swimming pool, so that the secondary circulating pipe network controls the circulation of the secondary circulation pipe intermittently according to the temperature of the second thermometer T2 through the control system 8, so that the water temperature in the swimming pool is constant, that is, the third thermometer T3 reaches the set value.

The foregoing embodiment is merely one of the preferred embodiments of the present invention, and conventional modifications and substitutions made by those skilled in the art within the scope of the technical solutions of the present invention shall all be encompassed within the protection scope of the present invention.

What is claimed is:

1. An efficient solar flat plate heat absorption system, wherein the system is composed of a primary circulating pipe network, a secondary circulating pipe network and a control system, the primary circulating pipe network is formed by communicating a pipeline in a pressure bearing water tank with a heat exchange tube I in a flat plate heat collector group through a pipeline I and a pipeline III, the secondary circulating pipe network is formed by communicating a pipe network at the bottom of a swimming pool with a heat exchange tube II in the flat plate heat collector group through a pipeline II and a pipeline IV, wherein an electric heater is arranged in the pressure bearing water tank, a first thermometer is arranged at a water outlet of the heat exchange tube I, a second thermometer is arranged at the water outlet of the heat exchange tube II, a third thermometer is arranged in the swimming pool, a fourth thermometer is arranged in the pressure bearing water tank, a primary circulating pump is arranged on the pipeline I, a secondary circulating pump is arranged on the pipeline II, and the electric heater, the first thermometer, the second thermometer, the third thermometer, the fourth thermometer, the primary circulating pump and the secondary circulating pump are connected with the control system.

2. The efficient solar flat plate heat absorption system of claim 1, wherein the flat plate heat collector group is composed of a plurality of flat plate heat collectors which are connected in series, and the heat exchange tube I and the heat exchange tube II are connected in parallel.

3. The efficient solar flat plate heat absorption system of claim 1, wherein a water inlet and a water outlet are formed in the pressure bearing water tank, the water inlet is connected with a cold water pipeline, and the water outlet is connected with a hot water pipeline.

4. The efficient solar flat plate heat absorption system of claim 1, wherein automatic exhaust valves, pressure release valves, one-way valves, filters, brake valves and solenoid valves are additionally installed in the primary circulating pipe network and the secondary circulating pipe network.

5. The efficient solar flat plate heat absorption system of claim 1, wherein the control system is a control cabinet.

6. An operation method of the efficient solar flat plate heat absorption system of claim 1, wherein when the sunlight is sufficient, for the primary circulating pipe network, if the temperature of the first thermometer reaches a set temperature, the control system starts the primary circulating pipe network by starting the primary circulating pump, if the temperature of the first thermometer is smaller than the set temperature, the control system stops the operation of the primary circulating pipe network, when the sunlight is not sufficient, for the primary circulating pipe network, the control system starts the electric heater in the pressure bearing water tank, and when the water in the pressure bearing water tank reaches the temperature of the fourth thermometer, the control system starts the primary circulating pipe network; and for the secondary circulating pipe network, if the temperature of the second thermometer reaches the set temperature, the control system starts the secondary circulating pipe network by starting the secondary circulating pump, if the temperature of the second thermometer is smaller than the set temperature, the control system stops the operation of the secondary circulating pipe network, so that the secondary circulating pipe network controls the circulation of the secondary circulation pipe intermittently according to the temperature of the second thermometer through the control system, so that the water temperature in the swimming pool is constant, that is, the third thermometer reaches the set value.

* * * * *